United States Patent
Woo et al.

(10) Patent No.: US 7,099,647 B2
(45) Date of Patent: Aug. 29, 2006

(54) SINGLE CHIP DIRECT CONVERSION TRANSCEIVER FOR REDUCING DC OFFSET AND METHOD OF MANUFACTURING THE SAME

(75) Inventors: Sang-hyun Woo, Seoul (KR); Jong-ae Park, Yongin-si (KR)

(73) Assignee: Samsung Electronics Co., Ltd., (KR)

( * ) Notice: Subject to any disclaimer, the term of this patent is extended or adjusted under 35 U.S.C. 154(b) by 369 days.

(21) Appl. No.: 10/767,089

(22) Filed: Jan. 29, 2004

(65) Prior Publication Data
US 2004/0185811 A1    Sep. 23, 2004

(30) Foreign Application Priority Data
Jan. 29, 2003    (KR) .................. 10-2003-0005929

(51) Int. Cl.
H04B 1/00    (2006.01)
H04B 1/16    (2006.01)
H04B 1/18    (2006.01)
H04B 1/28    (2006.01)

(52) U.S. Cl. .................. 455/317; 455/217; 455/293; 455/333; 329/306; 329/318; 331/18; 331/63

(58) Field of Classification Search ............... 455/131, 455/130, 141, 150.1, 140, 269, 296, 293, 455/323, 326, 341, 117, 300, 317, 63.1
See application file for complete search history.

(56) References Cited

U.S. PATENT DOCUMENTS 6,175,728 B1    1/2001   Mitama
6,360,087 B1    3/2002   Rozenblit et al.
6,944,436 B1 *  9/2005   Woo et al. .................. 455/317
2003/0032401 A1 * 2/2003 Woo et al. .................. 455/217

FOREIGN PATENT DOCUMENTS

JP    3-220823    9/1991

OTHER PUBLICATIONS

Sekiguchi et al., "Ultra Small Sized Low Noise Block Downconverter Module", Jun. 1, 1992.
Jeff Durec, "An Integrated Silicon Bipolar Receiver Subsystem for 900MHz Band Applications", Sep. 28, 1997.

* cited by examiner

*Primary Examiner*—Edward F. Urban
*Assistant Examiner*—Thuan T Nguyen
(74) *Attorney, Agent, or Firm*—Dilworth & Barrese LLP

(57) ABSTRACT

A single chip direct conversion transceiver that includes a substrate on which a mixer unit and a local oscillator are provided as a circuit, and a positive hole formed between the mixer unit and the local oscillator and filled with a conductive plug to block signal leakage. A shield ground surface is formed above the substrate and blocks signal leakage occurring when the signals received through the antenna are input into the mixer and signal leakage occurring when the reference signal is input into the mixer from the local oscillator. A first interconnection is formed above the shield ground surface and connects the mixer unit and the local oscillator. Dielectric layers are formed between the substrate and the shield ground surface and on the shield ground surface to cover the first interconnection.

13 Claims, 8 Drawing Sheets

SINGLE CHIP DIRECT CONVERSION TRANSCEIVER FOR REDUCING DC OFFSET AND METHOD OF MANUFACTURING THE SAME

PRIORITY

This application claims the priority of Korean Patent Application No. 2003-5929, filed on Jan. 29, 2003, in the Korean Intellectual Property Office, the disclosure of which is incorporated herein in its entirety by reference.

BACKGROUND OF THE INVENTION

1. Field of the Invention

The present invention relates generally to a direct conversion transceiver, and more particularly, to a direct conversion transceiver for reducing DC offset.

2. Description of the Related Art

Although the size, power consumption, and costs of a current portable radio terminal are remarkably reduced compared to the early stage of development thereof, there is still the need to further reduce the size, power consumption, and costs of the current portable radio terminal and to manufacture a portable radio terminal having a better quality.

A direct conversion architecture is a structure from which an image rejection filter is removed. The number of components used in the direct conversion architecture is reduced such that the size and power consumption of the portable radio terminal are reduced.

However, in order to apply such a direct conversion architecture to a portable radio terminal, a problem occurs during mixing that creates a DC offset. Further, it is difficult to distinguish such a DC offset from an actual signal, and the DC offset causes an amplifier provided at a next stage of a mixer to saturate.

Figure 1:
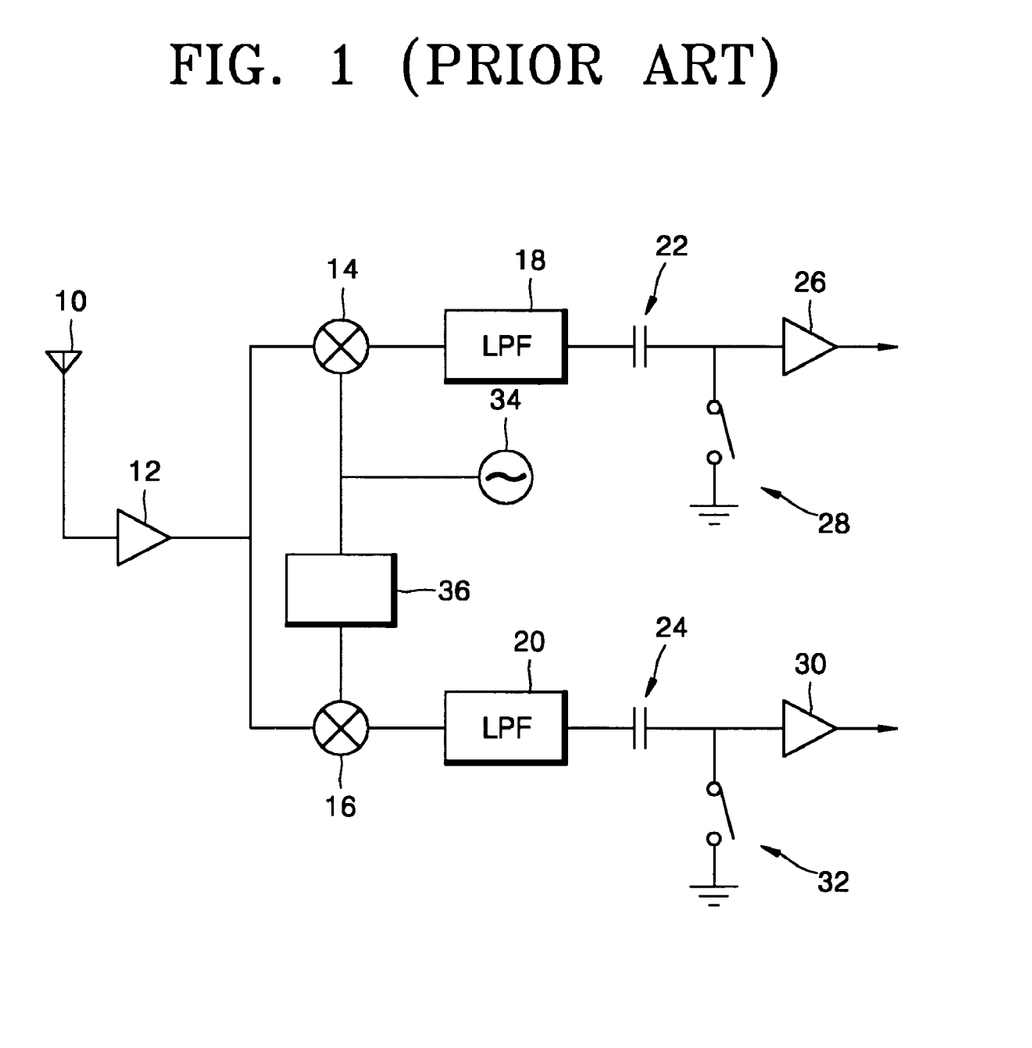
FIGS. 1 and 2 are circuit block diagrams illustrating methods of reducing DC offset in conventional direct conversion transceivers.
Figure 2:
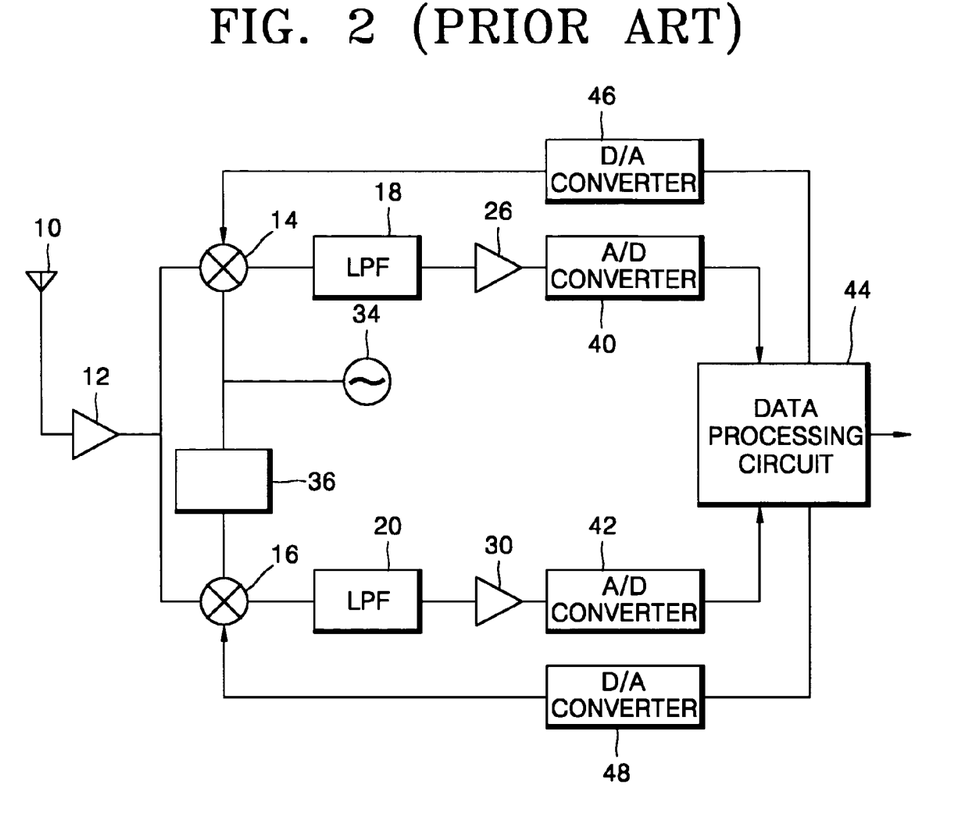

In order to solve the above-described DC offset problem, several methods have been suggested, and a new method is currently under development. FIGS. 1 and 2 each illustrate an example of a method for reducing a DC offset in a conventional direct conversion transceiver.

Referring to FIG. 1, signals received through an antenna 10 are amplified by a first amplifier 12 and are mixed with a reference signal generated in a local oscillator 34 by first and second mixers 14 and 16. In this procedure, carrier signals are eliminated from the signals. When the signals, which are output from the first and second mixers 14 and 16 and from which the carrier signals have been eliminated, go through first and second low pass filters (LPFs) 18 and 20, high frequency components are eliminated. Signals output from the first and second LPFs 18 and 20 are amplified by second and third amplifiers 26 and 30. Reference numeral 36 denotes a phase shifter for shifting the phase of the reference signal generated in the local oscillator 34 by 90 degrees.

Figure 3:
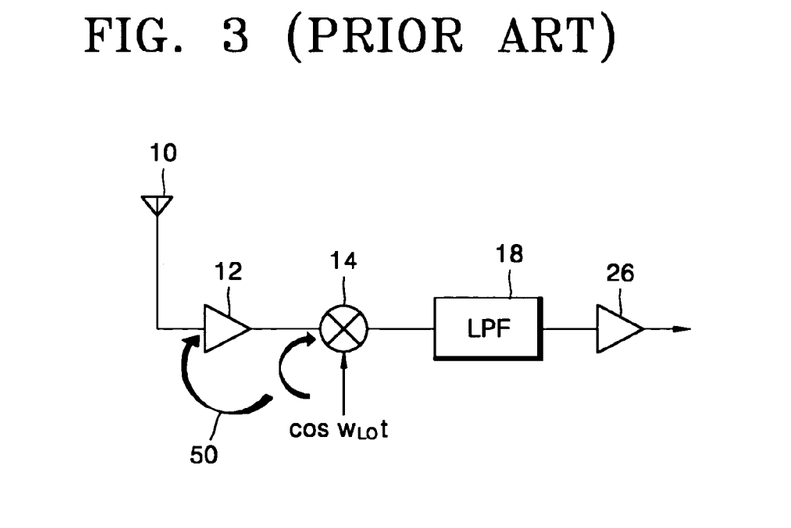
FIG. 3 is a circuit block diagram illustrating oscillator signal leakage in a conventional direct conversion transceiver.
Figure 4:
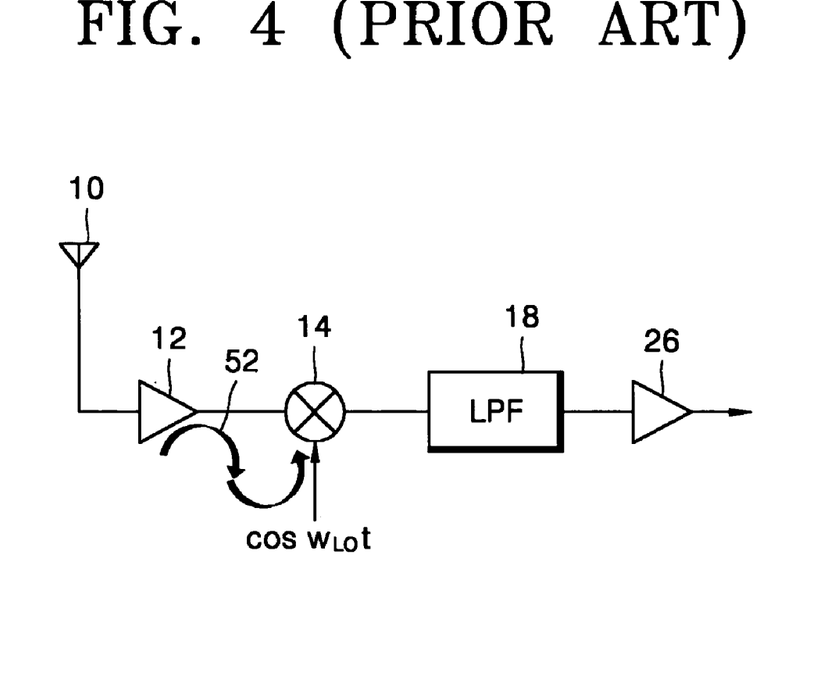
FIG. 4 is a circuit block diagram illustrating interference leakage of a low-noise amplifier in a conventional direct conversion transceiver.

Referring to FIG. 3, due to substrate coupling and bond wire coupling, oscillator signal leakage 50 occurs when a reference signal $\cos W_{LO}t$ is input into the first mixer 14 from a local oscillator (not shown). In addition, as illustrated in FIG. 4, due to substrate coupling and bond wire coupling, large interference leakage 52 occurs when the first amplifier 12 amplifies the signals received through the antenna 10. Leakage signals are self-mixed with a reference signal generated from the local oscillator, for example, as shown in Equation 1, and as a result, a DC offset occurs.

$$\cos w_{LO}t \times \cos w_{LO}t = \frac{1 + \cos 2w_{LO}t}{2} \quad (1)$$

The DC offset corresponding to ½ in Equation 1 causes the second amplifier 26, which is provided at a next stage of the first mixer 14, to saturate. In addition, the DC offset becomes irregular when signals are irradiated by the antenna 10, are reflected, and are received again. Additionally, it is difficult to distinguish the DC offset from the signals actually received.

In order to eliminate such a DC offset, the prior art illustrated in FIG. 1 includes a first capacitor 22 between the first LPF 18 and the second amplifier 26 and a second capacitor between the second LPF 20 and the third amplifier 30. However, in the prior art, the volume of the first and second capacitors 22 and 24 is large, and additional grounds 28 and 32 for charge and discharge are needed. As a result, the size of the circuit is increased, and it is difficult to produce it as a single chip IC. In addition, an application thereof is defined by time division multiple access (TDMA).

FIG. 2 illustrates a conventional direct conversion receiver as disclosed in Japanese Patent Publication Laid-open No. He 3-220823. More specifically, FIG. 2 illustrates a method of eliminating the above-described DC offset by a negative feedback loop. The negative feedback loop comprises a first analog to digital converter (A/D) converter 40 placed between a second amplifier 26 and a data processing circuit 44, a second A/D converter 42 placed between a third amplifier 30 and the data processing circuit 44, a first digital to analog (D/A) converter 46 placed between a first mixer 14 and the data processing circuit 44, for converting a predetermined digital signal output from the data processing circuit 44 into an analog signal and feeding back the analog signal to the first mixer 14, and a second D/A converter 48 placed between a second mixer 16 and the data processing circuit 44, for converting the predetermined digital signal into an analog signal and feeding back the analog signal to the second mixer 16. However, by use of a closed loop, a loop convergence time is restricted. As a result, like in a portable radio terminal, it is difficult to use the direct conversion receiver in a device having a short time slot.

Additionally, U.S. Pat. No. 6,175,728 discloses a direct conversion receiver with a delta-sigma modulator and a switch capable of canceling a DC offset voltage in real-time. However, because a switching time is required, an application of the direct conversion receiver is defined by time division multiple access (TDMA), and the size of a circuit is increased.

SUMMARY OF THE INVENTION

Therefore, an object of the present invention is to provide a single chip direct conversion transceiver with a built-in unit for eliminating DC offset.

It is a further object of the present invention to provide a method of manufacturing the single chip direct conversion transceiver.

According to one aspect of the present invention, there is provided a single chip direct conversion transceiver. The direct conversion transceiver comprises a mixer unit including a first amplifier for amplifying signals received through an antenna, the mixer for eliminating carrier signals from signals output from the first amplifier using a predetermined input reference signal, a low pass filter for eliminating high frequency components from the signals output from the mixer, and a second amplifier for amplifying signals output from the low pass filter, a local oscillator for providing the reference signal to the mixer. The direct conversion transceiver further comprises a substrate on which the mixer unit and the local oscillator are provided as a circuit, a positive hole formed between the mixer unit and the local oscillator in the substrate to a predetermined width and a predetermined depth and filled with a conductive plug to block signal leakage irradiated from the mixer unit and signal leakage irradiated from the local oscillator, a shield ground surface, which is formed above the substrate and blocks signal leakage occurring while the signals received through the antenna are input into the mixer and signal leakage occurring while the reference signal is input into the mixer from the local oscillator, a first interconnection, which is formed above the shield ground surface and connects the mixer unit and the local oscillator, and a dielectric layer, which is stacked between the substrate and the shield ground surface and on the shield ground surface to cover the first interconnection.

According to another aspect of the present invention, there is provided a method of manufacturing a single chip direct conversion transceiver. The method comprises forming a deep trench in a predetermined region of a substrate and filling the deep trench with a conductive plug, forming a mixer unit and a local oscillator on right and left sides of the deep trench of the substrate, forming a first dielectric layer and a shield ground surface on the substrate in which the deep trench, the mixer unit, and the local oscillator are formed, forming a second dielectric layer, which covers the shield ground surface, forming first and second through holes in the first dielectric layer, the second dielectric layer, and the shield ground surface and filling the first and second through holes with first and second conductive plugs, forming a first interconnection on the second dielectric layer, forming at least one dielectric layer on the second dielectric layer in which the first interconnection is formed and forming a conductive layer between the dielectric layers, and polishing the bottom surface of the substrate using chemical mechanical polishing until the conductive plug is exposed and forming a positive hole.

According to a structure of the single direct conversion transceiver, signal leakage occurring in most mixer units and local oscillators is effectively blocked by a shield ground surface and a positive hole filled with a conductive plug, such that the occurrence of DC offset is suppressed.

BRIEF DESCRIPTION OF THE DRAWINGS

The above aspects and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to the accompanying drawings. In the drawings, the same or similar elements are denoted by the same reference numerals even though they are depicted in different drawings. In the following description, a detailed description of known functions and configurations incorporated herein has been omitted for conciseness.

Figure 5:
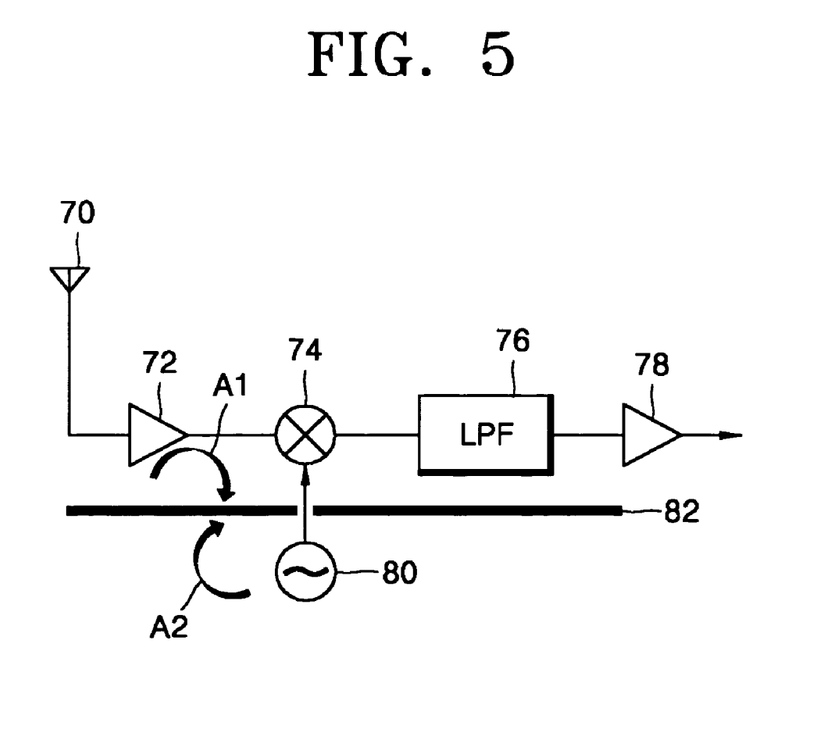
FIG. 5 is a conceptive circuit block diagram illustrating a shield ground surface formed between a mixer and a local oscillator in a direct conversion transceiver for reducing DC offset according to an embodiment of the present invention.

First, a direct conversion transceiver according to an embodiment of the present invention will be described with reference to FIG. 5. In FIG. 5, a mixer 74 mixes signals received through an antenna 70 and amplified by a first amplifier 72, with a predetermined reference signal supplied from a local oscillator 80. As such, carrier signals are eliminated from a signal output from the first amplifier 72. The local oscillator 80 provides the predetermined reference signal used to separate the carrier signals from the signals received through the antenna 70 and the first amplifier 72, to the mixer 74. A shield ground surface 82 is formed between the mixer 74 and the local oscillator 80. A signal output from the local oscillator 80 is transmitted to the mixer 74 through a region restricted by the shield ground surface 82. High frequency components of signals from which the carrier signal output from the mixer 74 are removed, are eliminated by a low pass filter (LPF) 76. A signal output from the LPF 76 is amplified by a second amplifier 78. Most of signal leakage A2 and interference leakage A1 occurring in the local oscillator 80 and the mixer 74 is absorbed into the shield ground surface 82 and blocked when the signals received through the antenna 70 are processed. In order to obtain a sufficient blocking effect, the thickness of the shield ground surface 82 is more than three times the skin depth of signal leakage.

Self-mixing of the interference leakage A1 and the signal leakage A2 with the reference signal generated in the local oscillator 80 is prevented by the shield ground surface 82. As such, the shield ground surface 82 formed between the mixer 74 and the local oscillator 80 minimizes a DC offset.

Figure 6:
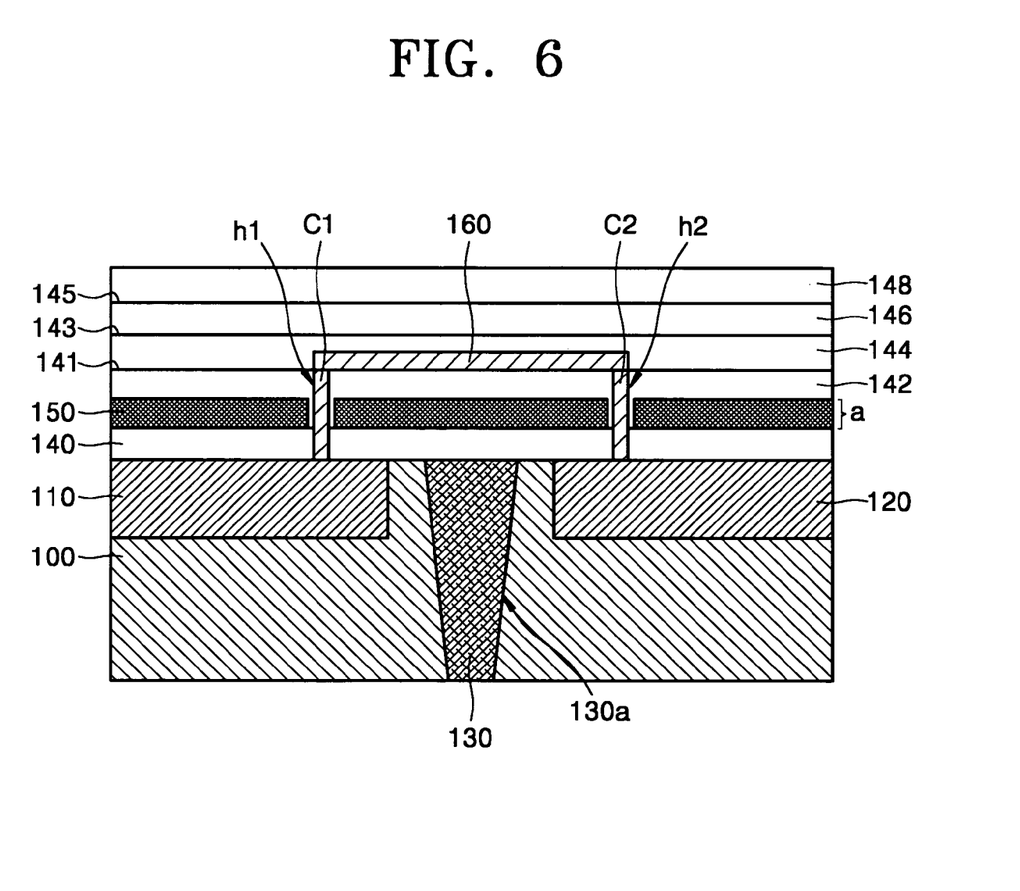
FIG. 6 is a partial cross-sectional view of a single chip direct conversion transceiver based on the concept illustrated in FIG. 5, according to an embodiment of the present invention.

FIG. 6 is a partial cross-sectional view of a single chip direct conversion transceiver based on the concept illustrated in FIG. 5, according to an embodiment of the present invention. Referring to FIG. 6, first through fifth dielectric layers 140, 142, 144, 146, and 148 are sequentially stacked on a substrate 100. First through third conductive layers 141, 143, and 145 are provided between the second through fifth dielectric layers 142, 144, 146, and 148, respectively. For example, the substrate 100 can be a silicon (Si) substrate. Additionally, a material having a high resistivity and a small loss tangent of a dielectric body, for example, bisbenzo cyclo butene (BCB) can be used for the first through fifth dielectric layers 140, 142, 144, 146, and 148.

Herein below, a member including the first amplifier 72, the mixer 74, the LPF 76, and the second amplifier 78 illustrated in FIG. 5 will be referred to as a mixer unit 110. The mixer unit 110, a local oscillator 120, and a positive hole 130a including a conductive plug 130 are formed in the substrate 100. Here, the local oscillator 120 has the same function as the local oscillator 80 illustrated in FIG. 5.

Referring to FIG. 6, the positive hole 130a is perforated at the center of the substrate 100. The positive hole 130a is filled with the conductive plug 130 made of copper (Cu), for example. The positive hole 130a is formed to a predetermined width and a predetermined depth so that signal leakage irradiated from the mixer unit 110 configured as a circuit on the substrate 100 and signal leakage irradiated from the local oscillator 120 are blocked. In order to obtain a sufficient blocking effect, the width of the positive hole 130a is more than three times the skin depth of signal leakage.

The mixer unit 110 is provided at one side on the top of the substrate 100, and the local oscillator 120 is provided at the other side on the top of the substrate 100, centering on the positive hole 130a. The mixer unit 110, the local oscillator 120, and the conductive plug 130 contact the bottom surface of a first dielectric layer 140. The first dielectric layer 140, a shield ground surface 150, and the second dielectric layer 142 are sequentially stacked on the substrate 100.

A first through hole h1, through which the mixer unit 110 is exposed, and a second through hole h2, through which the local oscillator 120 is exposed, are perforated in the first dielectric layer 140 and the second dielectric layer 142. The first through hole h1 and the second through hole h2 are filled with first and second conductive plugs C1 and C2, respectively. A shield ground surface 150 having a predetermined thickness a is formed between and around the first and second through holes h1 and h2 of the first dielectric layer 140 and the second dielectric layer 142. The shield ground surface 150 is a copper (Cu) plate, for example, and may be formed to a desired thickness by depositing a seed layer, such as TiCu or CrAu on the first dielectric layer 140 and electroplating copper (Cu) on the seed layer. The shield ground surface 150 has the same function as the shield ground surface 82 illustrated in FIG. 5.

A first interconnection 160 for connecting the first and second conductive plugs C1 and C2 is formed on the second dielectric layer 142. As such, the mixer unit 110 and the local oscillator 120 are connected by the first conductive plug C1, the first interconnection 160, and the second conductive plug C2.

A third dielectric layer 144 for converting the first interconnection 160, and fourth and fifth dielectric layers 146 and 148 are sequentially stacked on top of the second dielectric layer 142.

Figure 7:
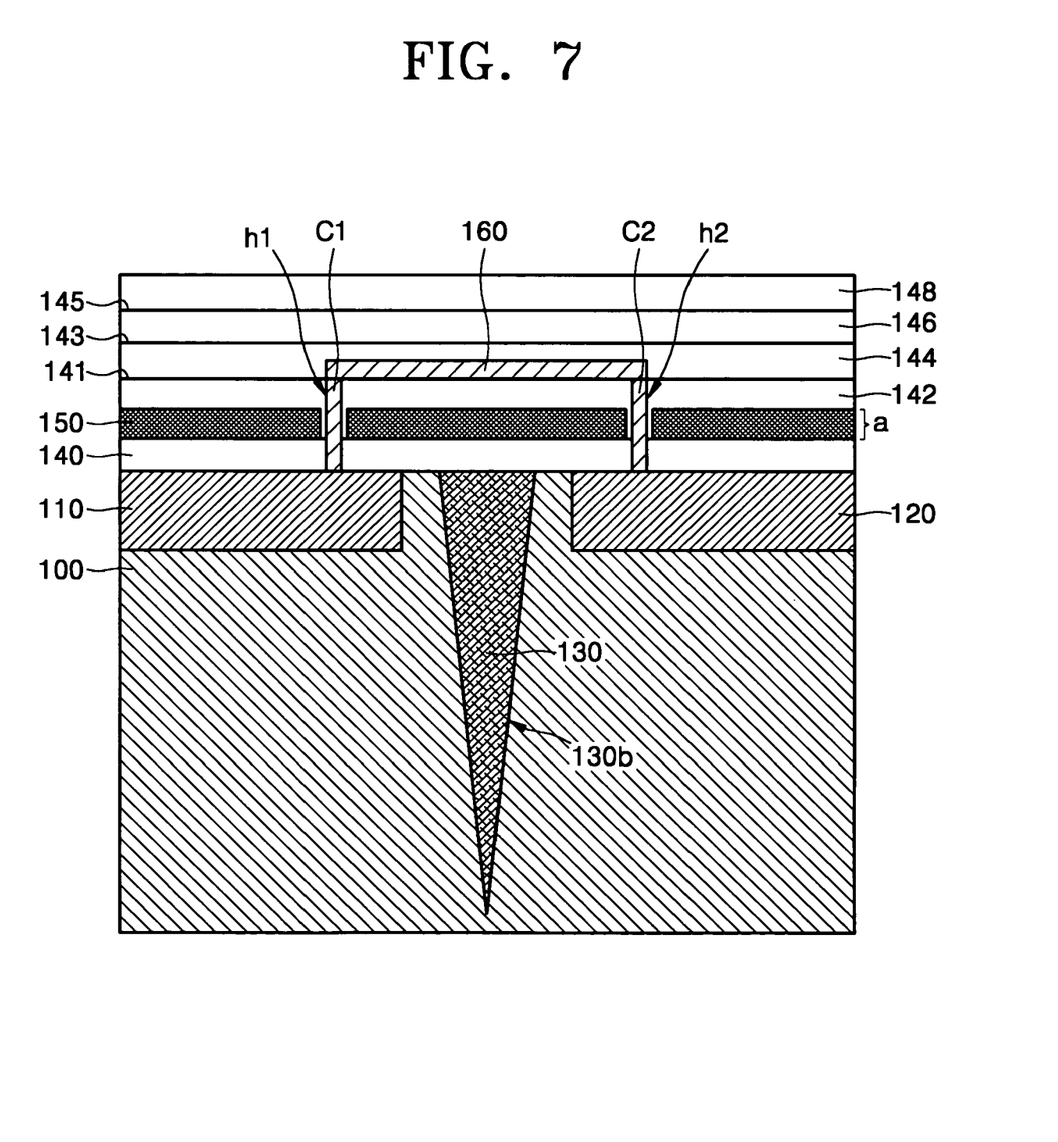
FIG. 7 is a cross-sectional view of a method of manufacturing the single chip direct conversion transceiver illustrated in FIG. 6, according to an embodiment of the present invention.

FIG. 7 is a cross-sectional view of a method of manufacturing the single chip direct conversion transceiver illustrated in FIG. 6, according to an embodiment of the present invention. The method of manufacturing the single chip direct conversion transceiver will be exemplarily described with reference to FIG. 7.

Referring to FIG. 7, a predetermined region of the substrate 100 is wet etched, and a deep trench 130b is formed. The deep trench 130b is filled with a conductive plug 130, for example, a copper (Cu) plug.

Subsequently, forming a mixer unit 110 and a local oscillator 120 on the right and left sides of the deep trench 130b in the substrate 100, forming a first dielectric layer 140 and a shield ground surface 150 above the substrate 100 in which the deep trench 130b, the mixer unit 110, and the local oscillator 120 are formed, forming a second dielectric layer 142 covering the shield ground surface 150, forming first and second through holes h1 and h2 in the first dielectric layer 140, filling the first and second through holes h1 and h2 with first and second conductive plugs C1 and C2, forming a first interconnection 160 on the second dielectric layer 142, forming at least one dielectric layer on the second dielectric layer 142 in which the first interconnection 160 is formed, and forming a conductive layer between the first and second dielectric layers 140 and 142, that is, forming third through fifth dielectric layers 144, 146, and 148 and first through third conductive layers 141, 143, and 145 are performed.

Thereafter, the bottom surface of the substrate 100 is polished by chemical mechanical polishing (CMP) until the conductive plug 130 is exposed, and a positive hole 130a, as illustrated in FIG. 6, is formed.

Alternatively, the above-described processes may be performed in a different order, that is, forming the mixer unit 110 and the local oscillator 120 on the substrate 100, filling the deep trench 130b and filling conductive plug 130, performing CMP on the bottom surface of the substrate 100, and forming the dielectric layers 140, 142, 144, 146, 148, and 150 and the shield ground surface 150.

In addition, the above-described processes may be performed in the order of forming the mixer unit 110 and the local oscillator 120 on the substrate 100, forming the deep trench 130b and filling the conductive plug 130, forming the dielectric layers 140, 142, 144, 146, 148, and 150 and forming the shield ground surface 150, and a process of performing CMP on the bottom surface of the substrate 100.

Figure 8:
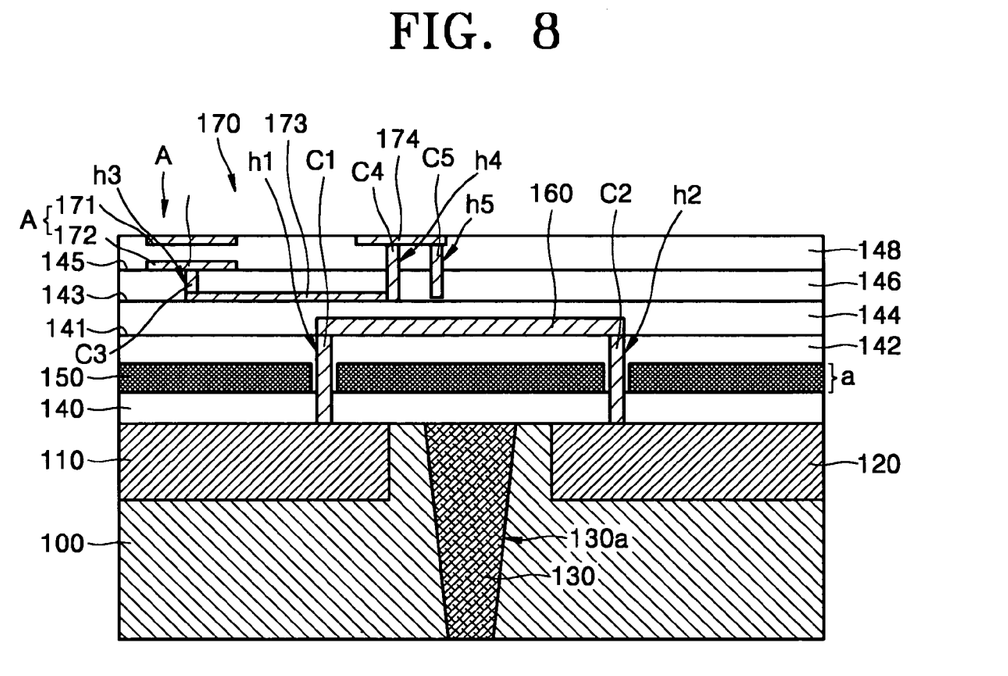
FIG. 8 is a partial cross-sectional view of the single chip direct conversion transceiver in which some passive elements of a local oscillator are formed on dielectric layers formed on a shield ground surface, according to an embodiment of the present invention.

Referring to FIG. 8, if some passive elements 170, for example, a capacitor A and an inductor 174, of the local oscillator 120 are formed on the fourth and fifth dielectric layers 146 and 148, the Q-factor of the local oscillator 120 is improved, and an amount of radiation of a signal caused by the substrate 100 is reduced. In FIG. 8, the capacitor A is provided by an upper electrode 171, a lower electrode 172, and the fifth dielectric layer 148 provided therebetween. In addition, the inductor 174 and the lower electrode 172 are connected by a second interconnection 173. Although in FIG. 8, passive elements of the local oscillator are formed on the fourth and fifth dielectric layers 146 and 148 by way of example, it should be noted that the passive elements of the local oscillator may be formed in predetermined regions of the dielectric layers 142, 144, 146, and 148 on the shield ground surface 150.

Figure 9:
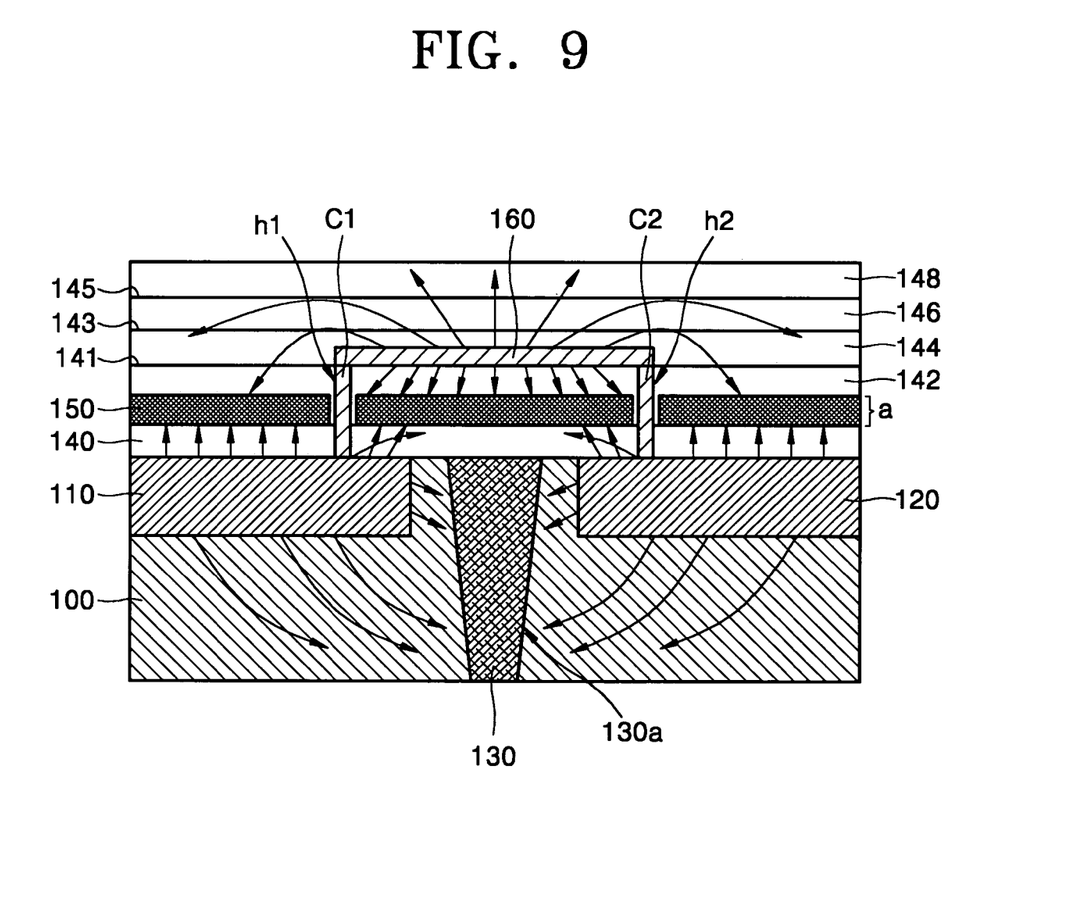
FIG. 9 is a partial cross-sectional view illustrating signal leakage occurring in a mixer and a local oscillator.

FIG. 9 is a partial cross-sectional view illustrating signal leakage occurring in the mixer 110 and the local oscillator 120. Referring to FIG. 9, signal leakage occurring in the first interconnection 160 takes most of signal leakage occurring between the mixer unit 110 and the local oscillator 120. However, because the first interconnection 160 is formed above the shield ground surface 150, most of signal leakage occurring in the first interconnection 160 is absorbed into the shield ground surface 150 and blocked. In order to obtain a sufficient blocking effect, the thickness a of the shield ground surface 150 and the width of the positive hole 130a filled with the conductive plug 130 are more than several times, e.g., at least three times the skin depth of signal leakage. The skin depth of signal leakage may be obtained by Equation 2.

$$\text{Skin depth} = \sqrt{\frac{\rho}{\pi \mu f}} \quad (2)$$

In Equation 2, ρ is a resistivity (3.59 in case of copper (Cu)), and μ is permeability (1 in case of Cu). Thus, when f=5.8 GHz and the shield ground surface 150 is Cu, the skin depth is about 14 μm. As such, the thickness a of the shield ground surface 150 and the width of the positive hole 130a filled with the conductive plug 130 are more than three times 14 μm and may be formed as 50 μm, for example.

The local oscillator 120 provides a predetermined reference signal used to separate carrier signals from signals received through an antenna, to the mixer unit 110. Signal leakage occurs in the second conductive plug C2 in which the reference signal is output from the local oscillator 120 and the first conductive plug C1 for inputting the reference signal into the mixer unit 110. The lengths of the first and second conductive plugs C1 and C2 are very short. Therefore, considering that signal leakage is proportional to the length of interconnection, most of signal leakage occurring between the mixer unit 110 and the local oscillator 120 is blocked by the shield ground surface 150.

In addition, in the substrate 100, most of signal leakage caused by radiation of the mixer unit 110 and the local oscillator 120 is absorbed by the positive hole 130a filled with the conductive plug 130. Therefore, the signal leakage and the DC offset that the reference signal generated in the local oscillator 120 are minimized.

Figure 10A:
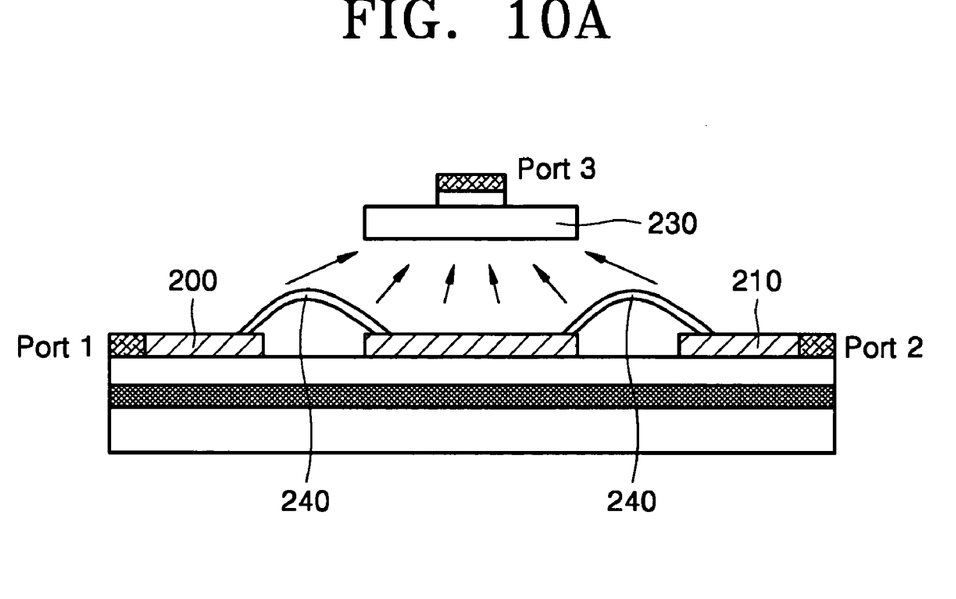
FIGS. 10A and 10B illustrate signal leakage irradiated from a mixer and a local oscillator measured depending on the presence of the shield ground surface.
Figure 10B:
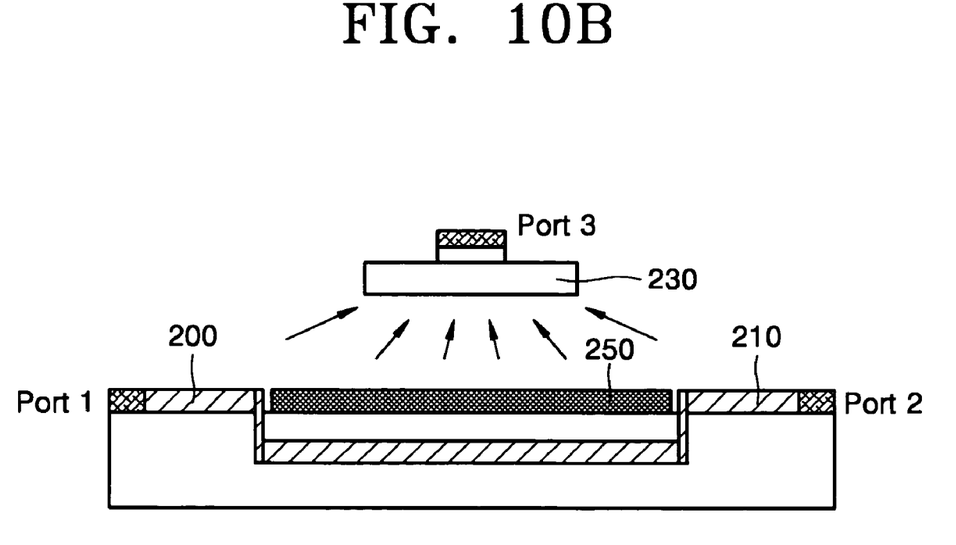

FIGS. 10A and 10B illustrate examples of signal leakage irradiated from a mixer 200 and a local oscillator 210 measured depending on the presence of the shield ground surface. Referring to FIG. 10A, when the mixer 200 and the local oscillator 210 are connected by wire bonding 240 without the shield ground surface, signal leakage of about −30 dB occurs at a center frequency of 5–6 GHz. However, as illustrated in FIG. 10B, when the mixer 200 and the local oscillator 210 are blocked by a shield ground surface 250, signal leakage of about −70 dB occurs at a center frequency of 5–6 GHz. As such, a blocking effect of about 40 dB can be obtained by the shield ground surface 250.

In general, the blocking degree of signal leakage needed between a mixer and a local oscillator is about 50 dB, and considering that signal leakage of about 30 dB is blocked in a mixer, a blocking effect provided by the present invention is more than satisfactory.

As described above, in a single chip direct conversion transceiver according to the present invention, a positive hole filled with a conductive plug is formed between a mixer unit and a local oscillator, and an interconnection for connecting the mixer unit and the local oscillator is formed above a shield ground surface. As a result, most signal leakage is effectively blocked by the shield ground surface and the positive hole filled with the conductive plug, such that the occurrence of a DC offset is suppressed. Further, the size, power consumption, and costs of the direct conversion transceiver are reduced when compared to a structure in which an existing circuit for a reducing DC offset is added.

In addition, the present invention is a single chip structure and prevents self-mixing caused by signal leakage. Therefore, the present invention may be applied to a direct conversion transceiver for all modulation methods, such as time division multiple access (TDMA), code division multiple access (CDMA), and frequency division multiple access (FDMA), and may be applied regardless of frequency bandwidths.

Further, the present invention is not affected by a characteristic of a substrate, such as a silicon substrate, or GaAs. In particular, a DC offset can be remarkably reduced even in a substrate having a large radiation characteristic, such as CMOS.

While the present invention has been particularly shown and described with reference to preferred embodiments thereof, it will be understood by those skilled in the art that various changes in form and details may be made therein without departing from the spirit and scope of the invention as defined by the appended claims.

What is claimed is:

1. A single chip direct conversion transceiver, comprising:
   a mixer unit including a first amplifier for amplifying signals received through an antenna, a mixer for eliminating carrier signals from signals output from the first amplifier using a predetermined input reference signal, a low pass filter for eliminating high frequency components from the signals output from the mixer, and a second amplifier for amplifying signals output from the low pass filter;
   a local oscillator for providing the reference signal to the mixer;
   a substrate on which the mixer unit and the local oscillator are provided as a circuit;
   a positive hole formed between the mixer unit and the local oscillator in the substrate to a predetermined width and a predetermined depth and filled with a conductive plug for blocking signal leakage irradiated from the mixer unit and signal leakage irradiated from the local oscillator;
   a shield ground surface formed above the substrate for blocking signal leakage occurring when the signals received through the antenna are input into the mixer and signal leakage occurring when the reference signal is input into the mixer from the local oscillator;
   a first interconnection formed above the shield ground surface for connecting the mixer unit and the local oscillator;
   a first dielectric layer formed between the substrate and the shield ground surface; and
   a second dielectric layer formed on the shield ground surface to cover the first interconnection.

2. The transceiver of claim 1, wherein at least one passive element of the local oscillator and a second interconnection for connecting the at least one passive element are formed in the second dielectric layer above the shield ground surface.

3. The transceiver of claim 1, wherein a thickness of the shield ground surface is at least three times a skin depth of a total signal leakage.

4. The transceiver of claim 1, wherein the predetermined width of the positive hole is at least three times a skin depth of a total signal leakage.

5. The transceiver of claim 1, wherein the conductive plug is made of copper (Cu).

6. The transceiver of claim 1, wherein the positive hole is formed in the substrate by wet etching.

7. A method of manufacturing a single chip direct conversion transceiver, the method comprising:
   forming a trench in a predetermined region of a substrate;
   filling the trench with a conductive plug;

forming a mixer unit and a local oscillator on opposite sides of the trench in the substrate;

forming a first dielectric layer on the substrate;

forming a shield ground surface covering the first dielectric layer;

forming a second dielectric layer covering the shield ground surface;

forming first and second through holes in the first dielectric layer, the second dielectric layer, and the shield ground surface;

filling the first and the second through holes with first and second conductive plugs, respectively;

forming a first interconnection on the second dielectric layer for connecting the mixer unit and the local oscillator;

forming at least one dielectric layer covering the second dielectric layer;

forming a conductive layer between each of the second dielectric layer and the at least one dielectric layer; and polishing a bottom surface of the substrate until the conductive plug is exposed, forming a positive hole.

8. The method of claim 7, wherein the trench is formed in the substrate by wet etching.

9. The method of claim 7, wherein the conductive plug is made of copper (Cu).

10. The method of claim 7, wherein the bottom surface of the substrate is polished using chemical mechanical polishing.

11. The method of claim 7, further comprising forming at least one passive element of the local oscillator and a second interconnection for connecting the at least one passive element in at least one of the second dielectric layer and the at least one dielectric later above the shield ground surface.

12. The method of claim 7, wherein a thickness of the shield ground surface is at least three times a skin depth of a total signal leakage.

13. The method of claim 7, wherein a width of the positive hole is at least three times a skin depth of a total signal leakage.

* * * * *